United States Patent [19]

Yumino

[11] Patent Number: 4,912,486

[45] Date of Patent: Mar. 27, 1990

[54] SUBLIMATION TYPE THERMAL PRINTER

[75] Inventor: Masamichi Yumino, Rochester, N.Y.

[73] Assignee: Eastman Kodak Company, Rochester, N.Y.

[21] Appl. No.: 339,532

[22] Filed: Apr. 17, 1989

[30] Foreign Application Priority Data

Jul. 22, 1988 [JP] Japan ............................ 63/0183362

[51] Int. Cl.[4] ............................................ G01D 15/10

[52] U.S. Cl. ............................... 346/76 PH; 355/282; 355/285; 400/120

[58] Field of Search ............................... 355/282, 285; 346/76 PH; 400/120

[56] References Cited

U.S. PATENT DOCUMENTS

| | | | |
|---|---|---|---|
| 4,609,278 | 9/1986 | Taniguchi | 355/285 |
| 4,691,211 | 9/1987 | Brownstein | 346/76 |
| 4,821,062 | 4/1989 | Katoh et al. | 355/285 |

FOREIGN PATENT DOCUMENTS

| | | | |
|---|---|---|---|
| 0219071 | 12/1983 | Japan | 400/120 |
| 0198261 | 10/1985 | Japan | 346/76 PH |
| 0016870 | 1/1986 | Japan | 346/76 PH |
| 0067065 | 6/1986 | Japan | 400/120 |

*Primary Examiner*—Bruce A. Reynolds
*Assistant Examiner*—Huan Tran
*Attorney, Agent, or Firm*—Raymond L. Owens

[57] ABSTRACT

A sublimation type thermal printer has a platen drum that is rotated with a sheet of recording paper placed thereon and a thermal head which is pressed against the recording paper through a dye donor film to heat the film so as to transfer a coloring matter from the film to the recording paper, thereby forming a desired image thereon. The thermal printer is provided with a fusing drum which is brought into contact with the recording paper on the platen drum to heat and thereby stabilize the coloring matter which has been transferred to the recording paper. The temperature of that surface of the fusing drum which is brought into contact with the recording paper is controlled on the basis of both the temperature of the drum surface and the temperature of the thermal head. In the formation of a full-color image with three dyes of different colors, the recording paper is heated by the fusing drum after the third dye has been transferred by the third turn of the platen drum. Thus, the dyes transferred to the recording paper are heated and the dye transferred last is satisfactorily diffused to achieve stablilized fixing.

4 Claims, 2 Drawing Sheets

SUBLIMATION TYPE THERMAL PRINTER

BACKGROUND OF THE INVENTION

1. Field of the Invention

The present invention relates to sublimation type thermal printers wherein dye is transferred to recording paper through sublimation and diffusion process caused by the heat from a thermal head.

2. Description of the Prior Art

A typical thermal printer has a structure such as that shown in FIG. 3. More specifically, the printer comprises a platen drum 1, a donor cartridge 2 and a thermal head 3. In forming an image, a sheet of recording paper R which is placed on the platen drum 1 is rotated, while a dye donor film I, which is accommodated in the donor cartridge 2, is fed in such a manner as to bring the recording paper R into contact with the platen drum 1, and the thermal head 3 presses against the donor film and the recording paper R.

The thermal head 3 has a large number of heating elements or resistors which are turned on and off in accordance with information for image formation in order to heat the dye donor film I and thus to transfer dye to the recording paper R through a sublimation and diffusion process, thereby forming a desired image on the paper R.

When a full-color image is to be formed, the platen drum 1 is rotated three full turns and each of the three different dyes, that is, yellow, cyan and magenta, is transferred during each revolution of the platen drum 1, thus forming a full-color image. For a more complete description of a thermal printer, see commonly assigned U.S. Pat. No. 4,691,211 to Brownstein.

The above-described conventional printer suffers, however, from the following problems. Dyes which have been transferred during the first and second turns of the platen drum 1 to form a full-color image are passed under the thermal head 3 during the respectively subsequent second and third turns of the drum 1 and are therefore subjected to the heat accumulated in the thermal head 3, thus achieving stabilized fixing. However,- the dye which is transferred during the third turn of the platen drum 1 is subjected to only one heating by the thermal head 3 and is therefore not sufficiently heated to be able to penetrate into the recording paper R to the full, so that it is impossible to achieve stabilized fixing.

In order to overcome this problems, it is conventional practice to pass the recording paper from the printer through a heater (fuser) so as to stabilize the transferred dyes. However, this conventional practice necessitates preparation of two separate apparatus, i.e., a printer and a fuser, which increases the cost, requires more space, and takes more processing time.

There is another problem with the sublimation type thermal printer. The thermal head should preferably be maintained at a predetermined temperature so that it is possible to obtain stabilized density when printing is started. If the temperature of the thermal head is not maintained above a certain level, the temperature of the head, which is relatively low when use of the head is started, becomes relatively high after it has been used for a certain period of time due to the accumulation of heat, which results in unacceptable density variations in the resulting print.

SUMMARY OF THE INVENTION

It is an object of the present invention to provide a sublimation type thermal printer which corrects the above-described problems of the prior art.

This object is achieved in a sublimation type thermal printer having a rotatable drum which carries a sheet of recording paper placed thereon and a thermal head which presses a dye donor film against the recording paper to heat said film so as to transfer dye from said film to the recording paper, thereby forming a desired dye image therein, the improvement comprising heating means, and means for moving said heating means into contact with the recording paper on said drum to apply heat to said recording paper to thereby stabilize the dye which had been transferred to said recording paper.

The heating means is generally a fusing drum which is provided adjacent to the platen drum. The temperature of that surface of the drum which is brought into contact with the recording paper is controlled on the basis of both the temperature of the drum surface and the ambient temperature inside of the thermal printer. The fusing drum is arranged not only to heat and thereby stabilize the dye which has been transferred to the recording paper, but also to heat the inside of the thermal printer.

When a full-color image is to be formed with the printer according to the present invention having the above-described arrangement, the platen drum with a sheet of recording paper placed thereon is rotated three full turns to thereby transfer three dyes of different colors to the recording paper in the same way as in the aforementioned conventional printer. In the printer according to the present invention, however, the recording paper is heated by the heating device (fusing drum) after the third dye has been transferred during the third turn of the platen drum.

Thus, the dyes transferred to the recording paper are heated and the dye transferred last is satisfactorily diffused to achieve stabilized fixing.

Accordingly, the printer according to the present invention increases processing time.

The surface temperature of the fusing drum is controlled with the temperature of the thermal head taken into consideration together with the surface temperature of the fusing drum in order to avoid any change in the density of the resulting print which would otherwise be caused if there were a change in the temperature of the thermal head, as described above. More specifically, the fusing drum heats the dyes transferred to the recording paper so as to fix them effectively, but the heat from the drum also raises the ambient temperature inside the printer. Accordingly, if the fusing drum is heated when the temperature of the thermal head has dropped below a predetermined level even during a period when the printer is not used, the ambient temperature inside the printer is raised, so that it is possible to maintain the temperature of the thermal head above a predetermined level.

DESCRIPTION OF THE PREFERRED EMBODIMENT

Figure 1:
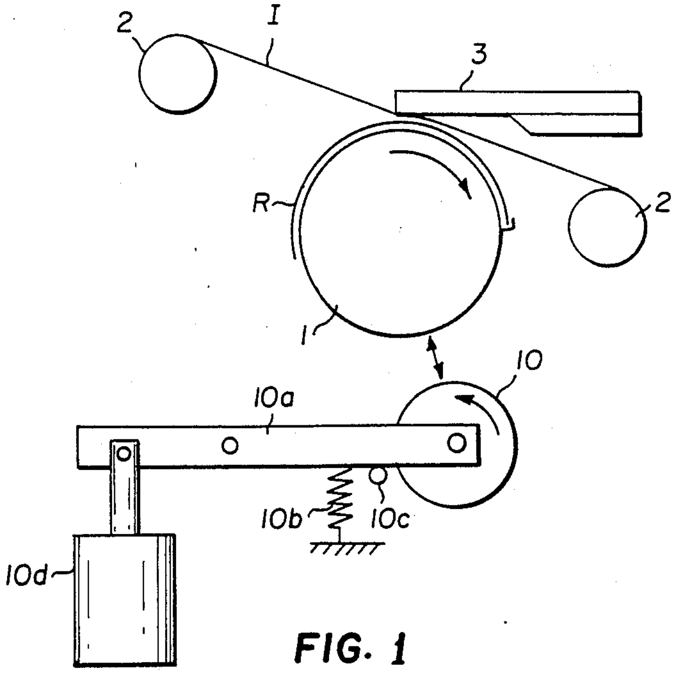
FIG. 1 schematically shows one embodiment of the sublimation type thermal priner according to the present invention.

The present invention will be described with reference to FIGS. 1 and 2.

The sublimation type printer according to the present invention comprises a conventional platen drum 1 which rotates together with a sheet of recording paper R supported thereon, a donor film cartridge 2 which feeds a dye donor film I in such a manner that the film I tangentially contacts the recording paper R, and a thermal head 3 which has a large number of heating elements (not shown) and which is pressed against the recording paper R on the platen drum 1 through the donor film I, in the conventional manner. In an operation of forming an image, the heating elements of the thermal head 3 are heated in response to an image forming signal to transfer the dyes in the ink donor film I to the recording paper R through a sublimation and diffusion process, thereby forming a desired image on the paper R. When a full-color image is to be formed, the platen drum 1 is rotated three full turns to transfer three different dyes, that is, yellow, cyan and magenta, thus forming a full-color image on the recording paper R, as described above.

The above-described structure and operation of this embodiment are the same as those of the prior art but the printer according to the embodiment of the present invention has a rotatably mounted fusing drum 10 which is set at a predetermined spacing from the platen drum 1.

The fusing drum 10 is moved toward the platen drum 1. The drum 10 is journaled in the bifrucated ends of a lever 10a. The levél 10a is biased by a spring 10b against a pin 10c. When a solenoid 10c is energized, it rotates the lever 10a in a counter clockwise direction until the drum 10 engages the paper R. In this position the drum 10 is capable of heating the recording paper R set on the platen drum 1. In the formation of a full-color image, after the third dye has been transferred to the recording paper R, the fusing drum 10 is moved toward the platen drum 1 to press and heat the recording paper R such as to stabilize the transferred dyes.

The fusing drum 10 is heated by means of a heating element such as a halogen lamp or an electric resistor. In the printer according to the illustrated embodiment, the fusing drum 10 is controlled so that the temperature of the fusing drum 10 is maintained at a constant level by means of the circuit shown in FIG. 2.

Figure 2:
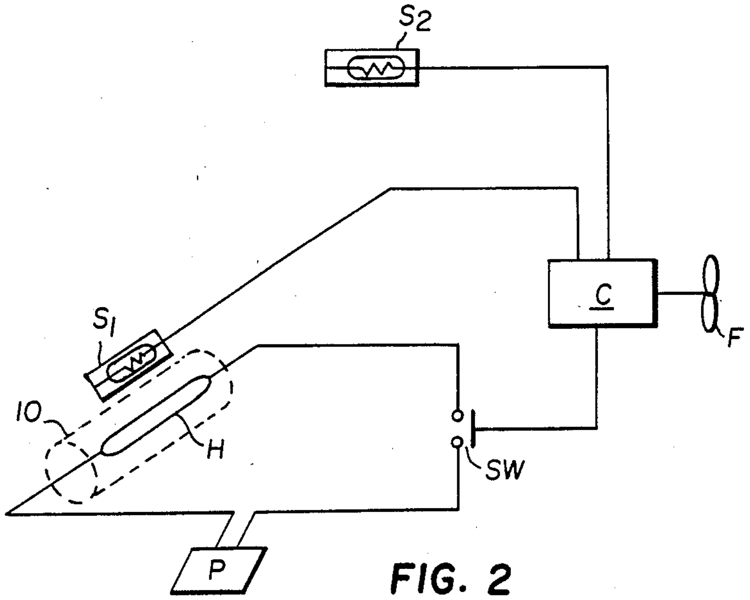
FIG. 2 shows a ciruit for controlling the heating element in the thermal printer shown in FIG. 1.
Figure 3:
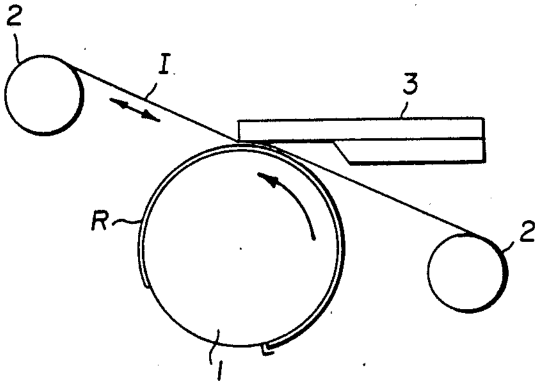
FIG. 3 (prior art)
FIG. 3 schematically shows a conventional sublimation type thermal printer.

Referring to FIG. 2, the reference symbol H denotes a heating element which is within the fusing drum 10, the heating element H is connected to a power supply P. A sensor S1 is set on the surface of the drum 10 to detect the temperature at the surface of the drum 10 and deliver a temperature signal to a controller C. The controller C also receives a signal from a sensor S2, which is physically located on or adjacent to the thermal head, for detecting the temperature of the thermal head 3 in order that, when the temperature of the thermal head 3 has dropped below a predetermined level, the fusing drum 10 is heated to raise the ambient temperature inside the thermal printer to thereby maintain the temperature of the thermal head 10 above a predetermined level. The controller C is arranged to generate a signal for opening and closing a switch SW provided between the heating element H and the power supply P. To lower the ambient temperature, controller deliver a signal for driving a fan F for discharging to the outside the air inside the printer.

The invention has been described in detail with particular reference to a preferred embodiment thereof, but it will be understood that variations and modifications can be effected within the spirit and scope of the invention.

What is claimed is:

1. In a sublimation type thermal printer having a rotatable drum which carries a sheet of recording paper placed thereon and a thermal head which presses a dye donor film against the recording paper to heat said film so as to transfer dye from said film to the recording paper, thereby forming a desired dye image therein, the improvement comprising heating means, and means for moving said heating means into contact with the recording paper on said drum to apply heat to said recording paper to thereby stabilize the dye which had been transferred to said recording paper.

2. The thermal printer according to claim 1, wherein said heating means includes a fusing drum, a heating element in the fusing drum and means for controlling the heating element to adjust the temperature of the fusing drum surface temperature which is brought into contact with the recording paper.

3. The thermal printer according to claim 2, wherein said control means controls the heating element to maintain the thermal printer inside ambient temperature, thereby maintaining the temperature of said thermal head at such constant temperature.

4. The thermal printer according to claim 2 wherein said controlling means includes first sensing means for sensing the temperature of said thermal head, second sensing means for sensing the temperature of the fusing drum surface, and means responsive to said first and second sensing means to control said heating element.

* * * * *